United States Patent [19]

Hofmann

[11] Patent Number: 5,043,924
[45] Date of Patent: Aug. 27, 1991

[54] METHOD AND APPARATUS FOR SCANNING AN OBJECT

[75] Inventor: Otto Hofmann, Kirchstockach, Fed. Rep. of Germany

[73] Assignee: Messerschmitt-Bolkow-Blohm GmbH, Fed. Rep. of Germany

[21] Appl. No.: 247,958

[22] Filed: Sep. 22, 1988

[30] Foreign Application Priority Data

Sep. 22, 1987 [DE] Fed. Rep. of Germany ....... 3731845
Dec. 10, 1987 [DE] Fed. Rep. of Germany ....... 3741864
Sep. 8, 1988 [DE] Fed. Rep. of Germany ....... 3830577

[51] Int. Cl.$^5$ ............................................. G06F 15/62
[52] U.S. Cl. ................. 364/525; 364/571.02; 250/558
[58] Field of Search ............... 364/423, 413.17, 413.18, 364/571.02, 516, 517, 521, 525; 250/558

[56] References Cited

U.S. PATENT DOCUMENTS

| 3,901,595 | 8/1975 | Heleva et al. | 250/558 X |
| 3,973,243 | 8/1976 | Whiteside et al. | 364/200 |
| 4,669,048 | 5/1987 | Ackermann et al. | 364/525 |
| 4,724,526 | 2/1988 | Cole et al. | 364/525 X |

Primary Examiner—Jerry Smith
Assistant Examiner—Stephen G. Kibby
Attorney, Agent, or Firm—Toren, McGeady & Associates

[57] ABSTRACT

The invention is directed to a method and an apparatus for scanning the terrain surface and other objects transversely to the flight direction or direction of motion of the scanner with a detector row arranged perpendicularly to the direction of scanning and containing several individual detectors of equal size, wherein the terrain- or object strip to be scanned is divided into various distance ranges, within which the fundamental detector signals within the detector row as well as of consecutive exposure periods are collated respectively in such a way by averaging, that the collated individual signals form or cover respectively one object pixel of approximately constant magnitude independent of the scanning distance, and wherein these object pixels stand always at right angles with respect to the scanning beam and where each scanning sweep produces a terrain- or object strip with approximately equal object pixel size as well as constant object pixel number along the width and length of the scanned strip. This method and apparatus eliminates the known deficiency of opto-mechanical scanners, whose scanned strips have changeable strip widths as a function of the scanning distance.

18 Claims, 14 Drawing Sheets

METHOD AND APPARATUS FOR SCANNING AN OBJECT

METHOD AND APPARATUS FOR SCANNING AN OBJECT

The invention is directed to a method and an apparatus for scanning the terrain surface and other objects transversely to the flight or direction of motion with a detector row arranged transversely to the direction of scanning and containing several individual detectors of equal size.

BACKGROUND OF THE INVENTION

This requirement arises especially for military reconnaissance and for remote reconnoitering in civil areas. So-called opto-mechanical scanners are used among others for this purpose, whose operational mode is generally known (see for instance Hofmann, O.: Image Quality of Active and Passive Scanners. Photogrammetry and Aerial Imaging 51, 1983, Vol. 3, pages 103–117). One detector or a plurality of detectors, arranged in the image plane of a lens, scan the terrain linewise transversely to the direction of flight. The scanning is accomplished by an optical deflection mechanism arranged upstream of the lens, typically a rotating mirror. One scanning line follows another transversely to the direction of flight because of the forward movement of the carrier, so that a terrain, or object strip is scanned. This is referred to in the claims as a plurality of periodic scanning sweeps of the object.

A fundamental problem of this method, especially during low flight or with large viewing angles, is that the distance from the scanner to the surface of the terrain or the object along a scanning line varies considerably and because of that the object point size acquired by the detector varies also provided that the focal length and the detector remain constant. Thus, overlaps with increasing viewing angle occur, since the terrain strips scanned by a detector increase in width with increasing viewing angle. This affects image resolution.

Basically a constant resolution of the object can be achieved with changing object distance by varying the focal length or size of the detector.

A known solution realized by the Texas Instruments firm (see J. M. Kaltenbach "Special Method for Avoiding Geometric Errors in the Course of IRLS", Carl-Cranz-Society, 47th Year of Publication page 1.08, Nov. 1986) consists in assembling the detector from individual partial detectors and to retrieve the signals of the individual partial pieces corresponding to the distance. The solution here is a special detector whose partial pieces have different shapes and sizes and which permits in each case only the scanning of one line in the direction of scanning in the course of a scanning process.

BRIEF DESCRIPTION OF THE INVENTION

The objective of the invention is a method and an apparatus of the type being discussed, which achieves a constant resolution over the entire scanning area, which allows scanning the object being flown over without any gaps and which permits adapting the entire system flexibly to differing parameters, for instance the flight altitude.

This objective is achieved in accordance with the invention by subdividing the object strip into different distance ranges, and collating or combining by averaging the detector signals to form object pixels of constant size but independent of scanning distance during one or over several consecutive exposure periods. More particularly, in accordance with the invention, the signals of the individual detectors are combined in such a way that object pixels of approximately constant size independently of the scanning distance can be formed over the entire area scanned. The solution indicated permits simultaneous scanning of several parallel scanning lines by a row of detectors of equal size yielding an object point size (pixel size) which is approximately independent of the distance. The simultaneous scanning of parallel lines oriented transversely to the direction of flight is especially required if a large geometric resolution, meaning small object pixel magnitudes, are demanded at high flying speeds.

Basically, the method consists of so-called "resampling" of a pixel grid, meaning the transformation of a non-uniform pixel grid into another regular one.

In case of the greatest scanning distance $E_{max}$, the so-called "fundamental object pixel size D" which corresponds to the specified "constant standard-object-pixel size B" as fundamental pixel size D decreases proportionally with decreasing distance E, and the standard-pixel size B is formed respectively by an optimum combination (resampling) of fundamental pixels D.

By this combination, meaning the averaging of several fundamental pixels D into a standard pixel B, the signal/noise ratio of the object-standard pixel B is improved at the same time.

When a fundamental pixel D corresponds to a standard pixel B at the maximum distance $E_{max}$ an improvement of the signal/noise ratio is therefore not possible within one scanning sweep.

However, the signal/noise ratio is most critical precisely at the maximum distance $E_{max}$, and there exists the necessity to improve it also in this case.

This aim is attained according to a preferred embodiment of the invention by making use of the overlap of adjacent scanned strips occurring with increased side distance and by combining the signals of repeatedly scanned terrain pixels, meaning they are integrated or averaged.

Other embodiments of the invention will be evident from the description that follows.

BRIEF DESCRIPTION OF THE DRAWINGS

The invention is described with particularity in several preferred embodiments with the assistance of the annexed drawings, of which.

DETAILED DESCRIPTION OF PREFERRED EMBODIMENTS

Figure 1:
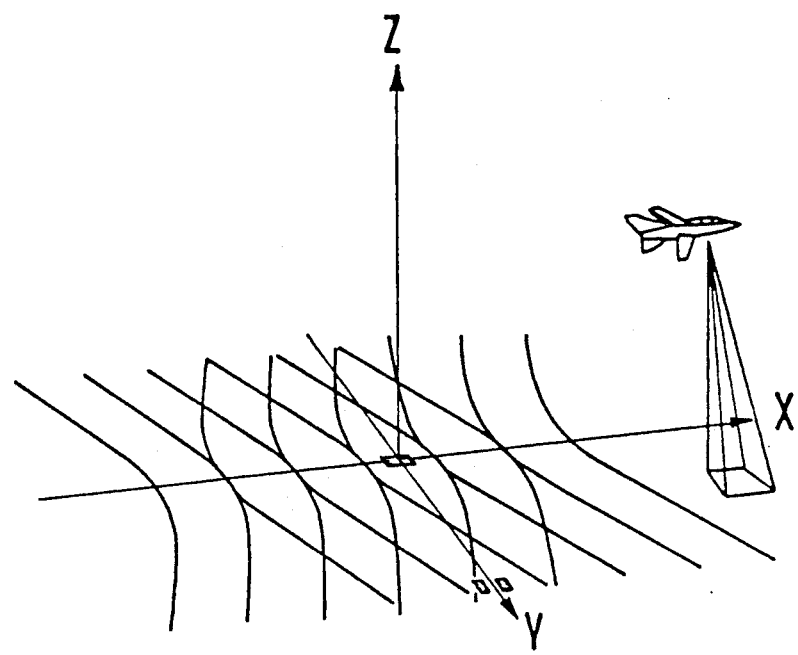
FIG. 1 is a diagrammatic illustration of a conventional scanning of a terrain surface from an aircraft.
Figure 2:
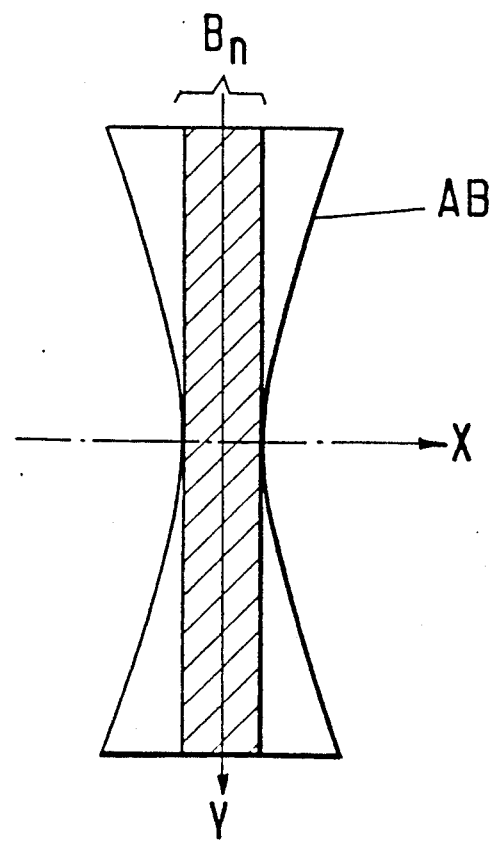
FIG. 2 is a diagrammatic illustration of a terrain strip with conventional scanning compared with scanning according to the invention.

In the course of conventional scanning of an object, for instance of a terrain surface from an aircraft as illustrated in FIG. 1, the scanned regions surveyed by a scanner show, a shape designated with AB in FIG. 2. The scanned regions extend in the Y-direction, the scanning direction perpendicularly to the X-axis which lies parallel to the direction of flight, and widens with increased distance from the X-axis. The terrain regions surveyed by the individual detectors of a scanner arranged in an aircraft vary thus in their size as a function of the respective distance between scanner and terrain region viewed. The output signals of the individual detectors are processed in such a manner in the invention, that the region scanned, as is indicated by shading in FIG. 2, becomes a rectangle with the width $B_n$ and that a constant resolution is achieved within this scanned region, meaning that the scanned region is subdivided into object pixels with respectively equal pixel size. Thus, it is required that the pixel sizes of the object which stand respectively at right angles to the scanning beam are approximately independent of the distance to the object.

A plurality of detectors of equal size are arranged next to each other in a row in the image plane of the scanner perpendicularly to the direction of scanning. The scanning beam bundle moves in a plane perpendicular to the direction of flight and which is approximately identical with the drawing plane or plane of projection in FIG. 3.

The size of the individual detectors and the focal length of the scanner are as a rule dimensioned so that the specified object pixel size is covered by one detector and one exposure period at the greatest object distance (transversely to the direction of flight). The detector width d determines the "fundamental object-pixel size" $D_x$ in the direction of flight, the fundamental object pixel height $D_y$ in the scanning direction being determined by the exposure period $\Delta t$. As a rule one selects $D_x$ and $D_y$ to be equally large. Simple relationships then obtain:

$$D_x = \frac{E \cdot d}{F} \tag{1}$$

$$D_y = \omega \cdot E \cdot \Delta t \tag{2}$$

Therein the symbols mean:
E = Object point distance
F = Focal length
d = Width of detector
$\omega$ = The scanning angular velocity
$\Delta t$ = The exposure period (exposure duration of a fundamental detector signal). This corresponds to the scanning of the output signals of individual detectors over a plurality of short scanning periods $\Delta t$ within each object scanning sweep.

The invention pursues the aim of producing n parallel, equally large object pixels always constant in their number in the course of one scan and of storing them in an image memory, meaning one scanning sweep forms one image strip of constant width transversely to the direction of flight. The width $B_n$ (FIG. 2) of this strip (in the object) is $$B_n = n \cdot B_x \tag{3}$$

wherein $B_x$ represents the desired width of the object pixel. Approximately constant object pixel magnitudes $B_y$ are to be generated also in the scanning direction Y independently of the momentary viewing angle, meaning of the scanning distance.

The object distance changes constantly in the course of a scanning process, and the object pixel size shrinks also according to equations (1) and (2) with diminishing distance E.

In order to compensate for this known effect, one subdivides now the entire distance range into several partial ranges, within which one respectively combines signals of several adjacent detectors and several exposure periods in such a way by averaging, that the combined fundamental detector signals or exposure periods respectively cover one surface in an optimum fashion, which surface corresponds to the predetermined object pixel sizes $B_x$ and $B_y$.

Figure 5:
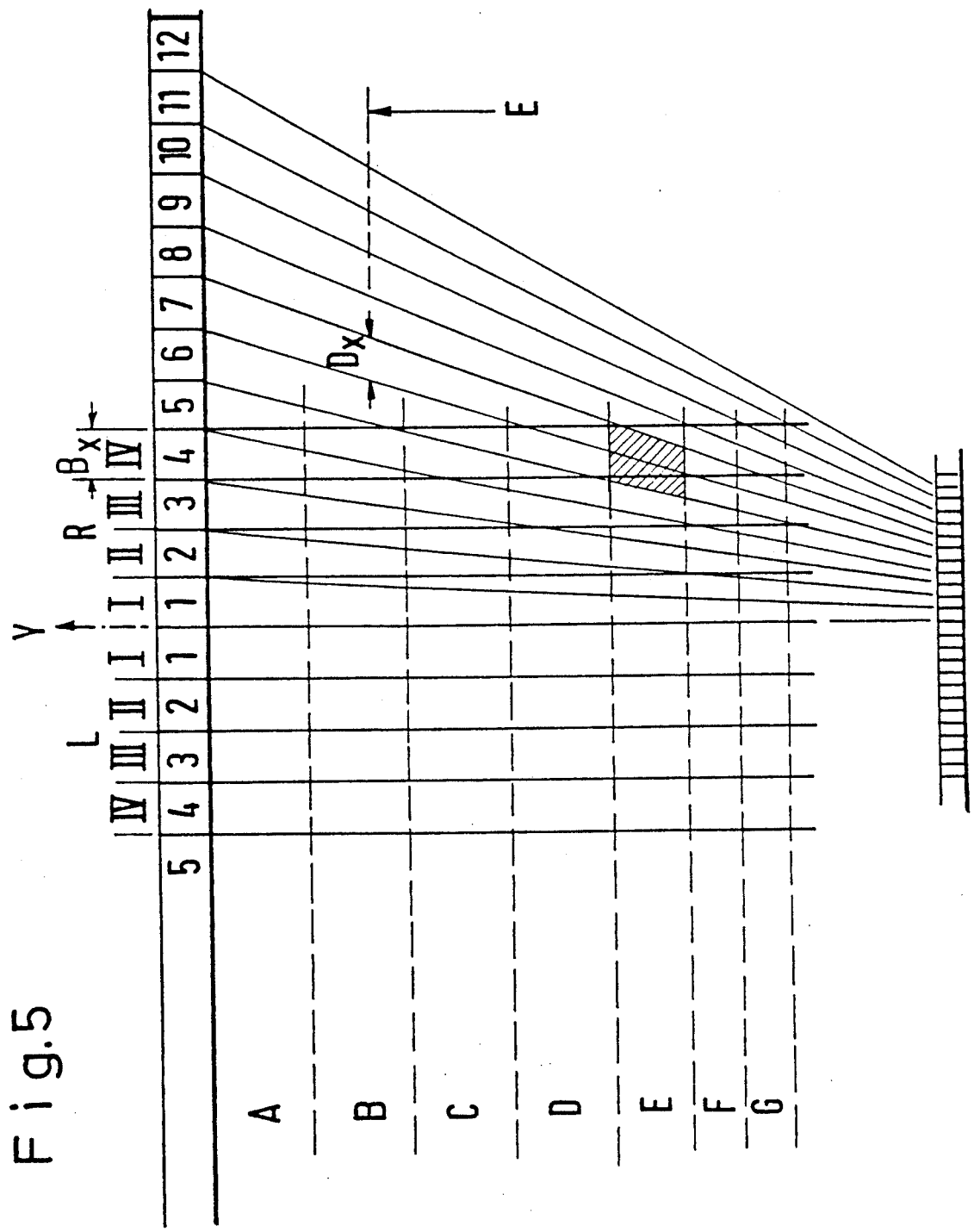
FIG. 5 is a diagrammatic illustration of the scanning region, by means of which the generation of object pixels of equal size is explained.
Figure 6:
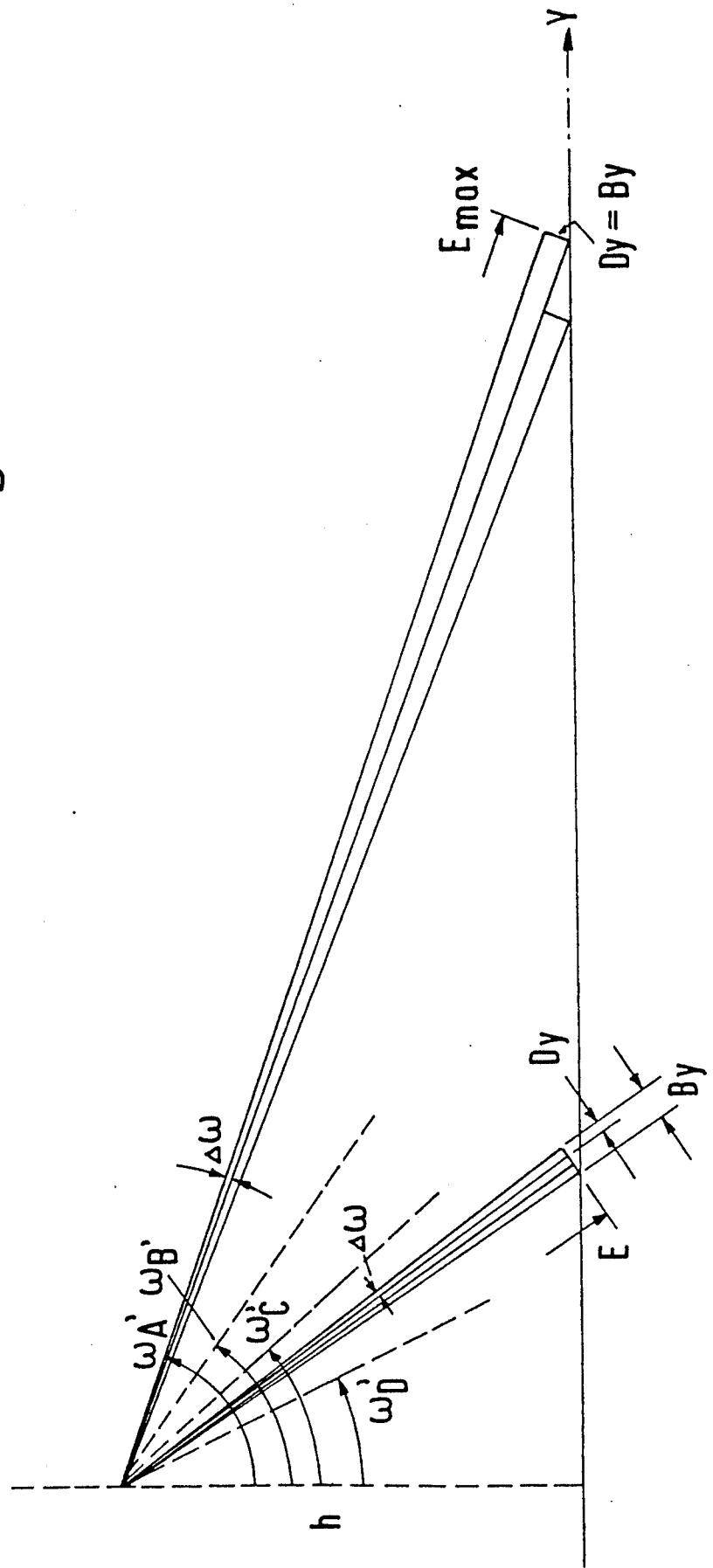
FIG. 6 is an illustration similar to FIG. 3 in order to explain the generation of object pixels of equal size.

This is clarified with the help of the examples give in FIGS. 5 and 6. Herein one has to make allowances for the circumstance that these images are greatly distorted. The distances E in the Y-direction are depicted so as to be greatly shortened in relationship to the extent of the pixels D or B.

In FIG. 5 the Y-axis is the line of symmetry of the scanning trace or line. Constant object pixel size is $B_x$. Respectively four ground pixels I, II, III, IV, are formed on the left hand side L and on the right hand side R of this Y-axis. The detectors left L and right R are designated by 1, 2, 3, 4 . . . . the distance ranges by A, B, C . . .

Table 1 shows which detector signals are respectively combined within one distance range in order to generate the ground pixel width $B_x$.

TABLE 1

|   | I | II | III | IV |
|---|---|---|---|---|
| A | 1 | 2 | 3 | 4 |
| B | 1 | 2 | 3 + 4 | 5 |
| C | 1 | 2 | 4 | 5 |
| D | 1 + 2 | 3 | 4 + 5 | 6 |
| E | 1 + 2 | 3 + 4 | 5 + 6 | 6 + 7 |
| F | 1 + 2 | 3 + 4 | 5 + 6 | 7 + 8 |
| G | 1 + 2 | 3 + 4 + 5 | 5 + 6 + 7 | 8 + 9 |

The object pixels $B_x$ of the row IV are produced for instance by fundamental pixels $D_x$ of the detectors 6 and 7 in the distance range or band E. This sector is shaded in FIG. 5.

Basically one proceeds in the same fashion in the scanning direction: here also the signals of consecutive fundamental exposure periods $\Delta t$ or fundamental angular increments $\Delta w = \dot{\omega} \cdot \Delta t$ are compiled and average, so that object pixels $B_y$ of approximately equal size are formed across the entire scanning sector also in Y-direction, wherein it will be noted that these object pixels $B_y$ stand respectively perpendicularly to the corresponding scanning beam. FIG. 6 explains this process; it corresponds to FIG. 3.

The fundamental angular increment corresponding to a scanning or clock pulse period $\Delta t$ is $\Delta \omega = \dot{\omega} \cdot \Delta t$, wherein $\omega$ represents the scanning velocity; $\Delta \omega$ is constant at least for one object scanning sweep. For the greatest scanning distance $E_{max}$ one object pixel $B_y$ corresponds to one fundamental pixel $D_y = E_{max} \cdot \Delta \omega$. The shorter the distances become, the more angular increments $\Delta \omega$ accrue to one object pixel; in FIG. 6 there are for instance three fundamental pixels $D_y$ or three angular increments $\Delta \omega$ which are combined into one object pixel $B_y$ for the depicted distance E.

Henceforth also in this case angular segments $\omega_{A'}$, $\omega_{B'}$ ... or distance ranges A', B' etc. (not depicted in FIG. 6) can be determined, within which a constant number of scanning signals (which correspond respectively to one clock signal or one angular increment) are combined and averaged.

These regions can but need not be identical with the pixel regions, A, B, C ... in the X-direction. Since the distances change continuously in the course of one scanning cycle, but the pixel numbers accrue only in integer pixel numbers, there arise in the boundary regions certain inaccuracies, such as more or less always occur during a resampling process and analogously hereto are also discernible from FIG. 5.

If for instance such a scanning apparatus is laid out as already stated above in such a way that the fundamental object pixel sizes $D_x$ and $D_y$ correspond to the object pixel sizes $B_x$ and $B_y$ for the greatest object scanning distance or the largest viewing angle, then in order to form an object pixel of the size $B_x = B_y = B$ for the shortest distance $E_{min}$, the number of $M_x$ detector signals $$m_x = \frac{B_x}{D_x} = \frac{B_x \cdot F}{E_{min} \cdot d} \quad (4)$$

and the number of $m_y$ exposure periods $$m_y = \frac{B_y}{D_y} = \frac{B_y}{E_{min} \cdot \dot{\omega} \cdot \Delta t} \quad (5)$$

must be combined.

Accordingly the detector row must contain at least $$M = m_x \cdot n \quad (6)$$

individual detectors, if the object pixels B are to be respectively covered by fundamental pixels D in the entirety of the distance ranges.

The distance region boundaries A, B, C ... or A', B', C' ... can but need not be identical.

The total number S' of object pixels in the scanning direction results from the sum of the object pixel numbers in the individual regions $$P'_A + P'_B + P'_C \ldots = S' \quad (7)$$

Figure 4:
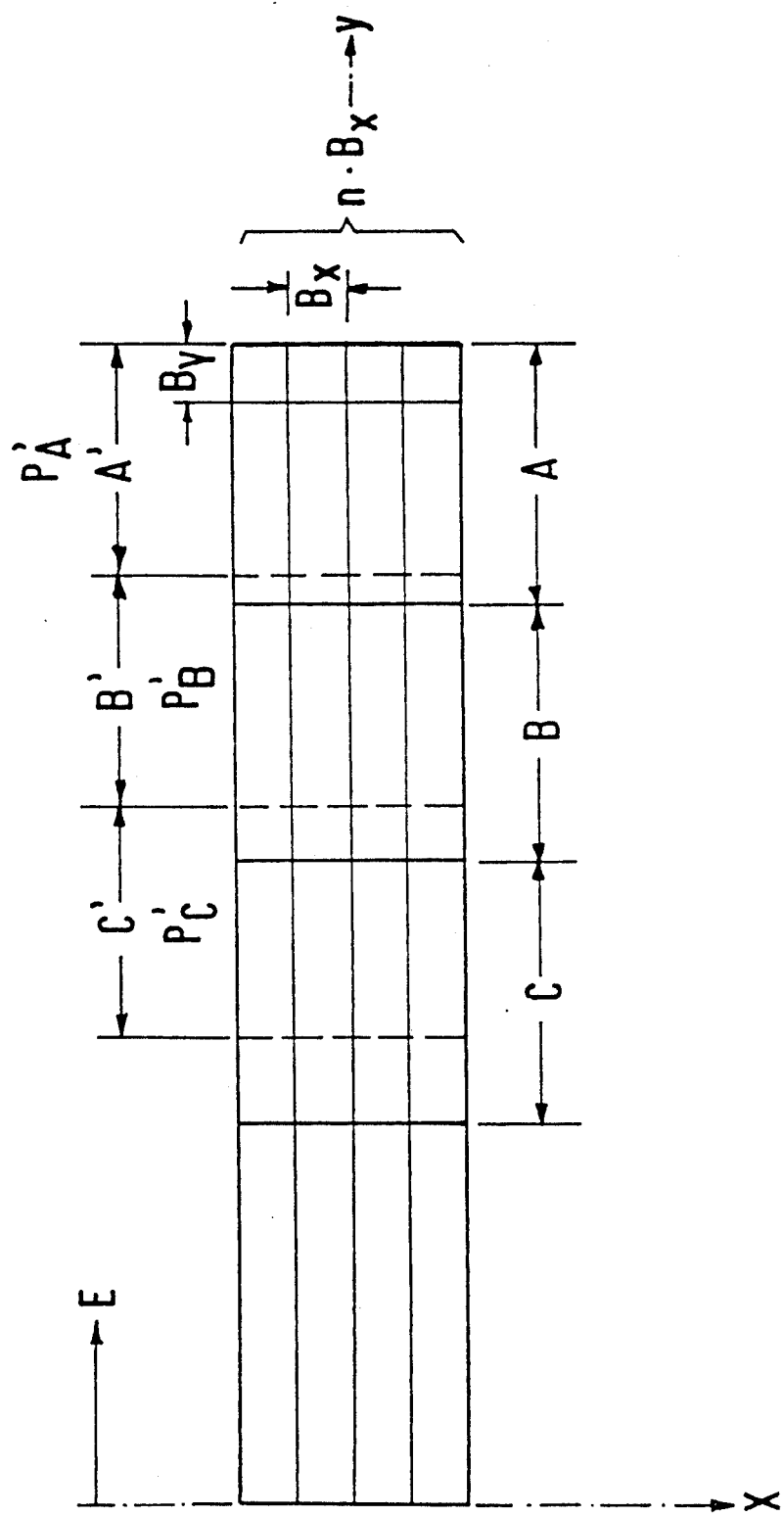
FIG. 4 shows a strip of object pixels generated by the scanning process.

A scanned strip thus contains the constant number of $$n \cdot S' \quad (8)$$

object pixels (see FIG. 4).

The distance regions A, B, C, ... or A', B', C' ... and the object pixel sums $p'_A$, $p'_B$, $p'_C$ ... are as a rule of different magnitudes: they are a function of the viewing angle and the flight altitude.

The aggregate image strip produced by the scanner consists of continuous uninterrupted partial image strips lying transversely to the direction of flight. In order to achieve this continuous partial strip sequence without any overlap and gaps the following condition must be satisfied:

$$v = F_A \cdot B_n \quad (9)$$

wherein
v[m/s] = flight speed
$F_A$[1/s] = the scanning frequency
$B_n$[m] = the partial strip width.

The proposed functional mode can be incorporated in opto-mechanical scanners of the most varied type. For this purpose only one detector row with equally large individual detectors extending transversely to the direction of flight must be arranged in the image plane of the scanner lens (see equation 6).

The parameters of the scanner,
Focal length F
Size of detector element d
Quantity of detectors M
Quantity of scanner traces n
Scanning velocity $\dot{\omega}$ (angular velocity)
Exposure period $\Delta t$
Distance ranges A, B, C ... A', B', C' etc.
result from the flight parameters (flight altitude h, flight speed v), the angle of view transversely to the direction of flight and the required object-pixel size B.

Figure 3:
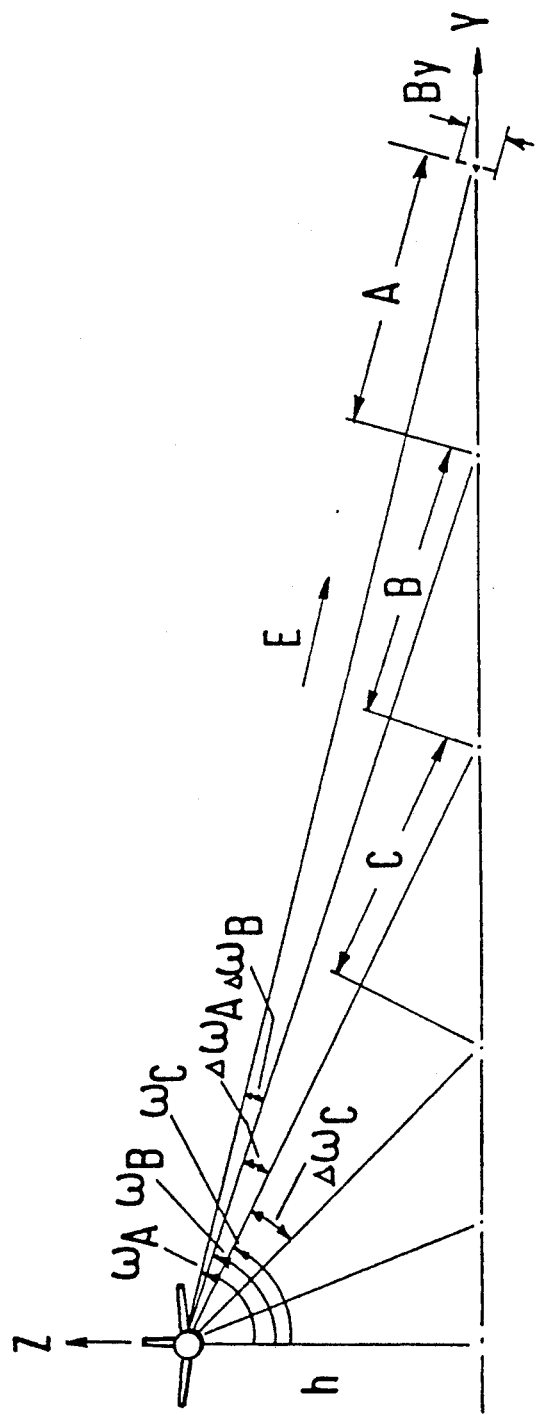
FIG. 3 is a schematic illustration of a scanning operation of a terrain strip transversely to the direction of flight of an aircraft in order to explain system parameters important for the invention.

The corresponding angular rotation sectors $\Delta \omega_A$, $\Delta \omega_B$, $\Delta \omega_C$ or $\Delta \omega_{A'}$, $\Delta \omega_{B'}$, $\Delta \omega_{C'}$ are assigned respectively to the distance ranges (see FIG. 3). These rotational angle segments can be determined at constant rotational speed of tho scanner from the rotational period for these angles $t_A$, $t_B$, $T_C$ ... or $t_{A'}$, $t_{B'}$, $t_{C'}$ ... with reference to a benchmark (index). This benchmark can be varied as a function of the rolling attitude of the carrier and can respectively define the vertical or plumb line. For more accurate measurements these angles of rotation can be tapped from an angle position generator coupled with the axis of rotation of the scanner.

Figure 7:
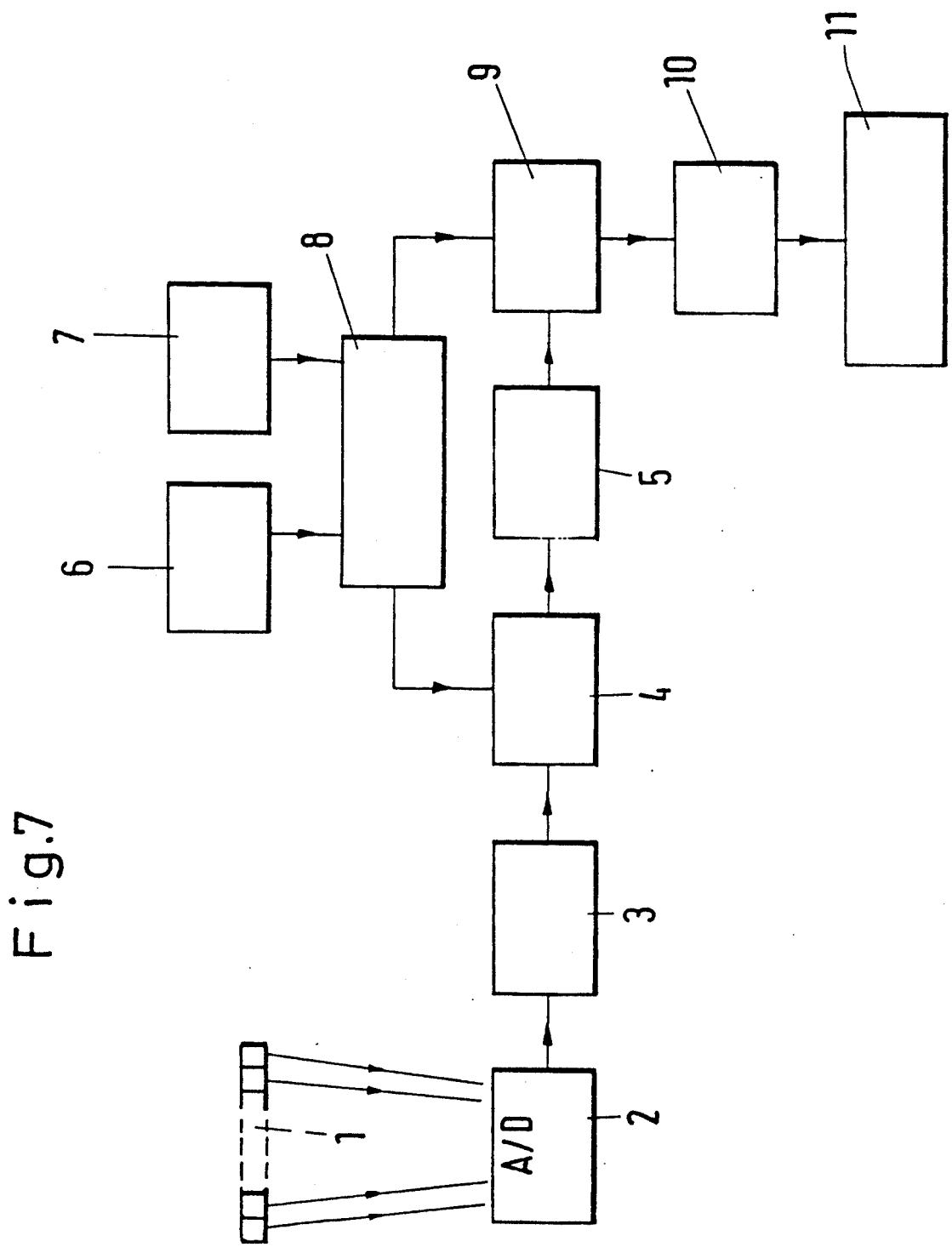
FIG. 7 is a block circuit diagram of a first embodiment of an apparatus according to the invention for scanning a terrain surface.

The detector signal processing and the overall functioning of the scanner is discernible from FIG. 7.

The analogous fundamental detector signals of several equal-sized detectors 1 arranged in one row perpendicularly to the direction of scanning are digitized by an A/D-converter 2, and stored in one first memory 3. Each detector signal is represented by a number, for instance a binary 8-bit number and corresponds to a fundamental pixel. A first processor 4 controlled by a programming module 8 retrieves the fundamental detector signals of one exposure period $\Delta t$ from the memory 3 and combines them respectively as a function of the distance ranges A, B, C ... etc. into an object pixel. Each of these composite n pixels corresponds to one object pixel width $B_x$.

These n pixels are supplied to a second memory 5, which can receive the pixels of several exposure periods. A second processor 9 also controlled by the programming module 8 collates several exposure periods as a function of the distance ranges A', B', C' ... within each of the n pixel sequences and feeds these to a third memory 10, which receives respectively the pixels of one scanning strip. The Y-coverage of each composite pixel corresponds now to the object pixel size $B_y$. The pixels can be read out from the memory 10 and can be stored in a bulk storage 11, for instance on a magnetic tape.

The programming module 8 is controlled by the angular position of the scanner or by an angular position generator 6 connected with the scanner, in order to be able respectively to detect the corresponding distance regions.

The optimum distance region and pixel combinations depend among other things on the flight altitude h above ground. One therefore lays down optimum distance ranges and pixel combinations for randomly stepped altitude ranges in tables and stores them in the programming module 8 which is controlled by an altimeter 7.

The object pixels resolution $B_x$, $B_y$ can also be changed by this programming module 8, meaning that various object pixel resolutions can be set up or programmed.

This method and this apparatus have the following advantages:

1. The object pixels standing perpendicularly to the scanning beam are independent of the distance and nearly of equal magnitude.

2. A scanned strip can contain one or several parallel pixel rows n.

3. Each scanned strip contains always a constant number of object pixels in X- and Y-direction and the strip width $B_n$ is constant.

4. The scanned strips can therefore follow one upon the other continuously and without overlaps or gaps in case of a scanning velocity matched to the flight speed.

5. Commercially available detector arrays also integrating detectors (for instance TDI, or Sprite detectors) can be used as detectors. A quantity of individual detectors will in actual practice be of the order of magnitude of 20 to 200, this depends upon the respective requirements.

6. The method is very flexible. By appropriate programming the object pixel size can be changed and made to be nearly independent of the flight altitude. This adaptation can occur automatically during flight.

Figure 8:
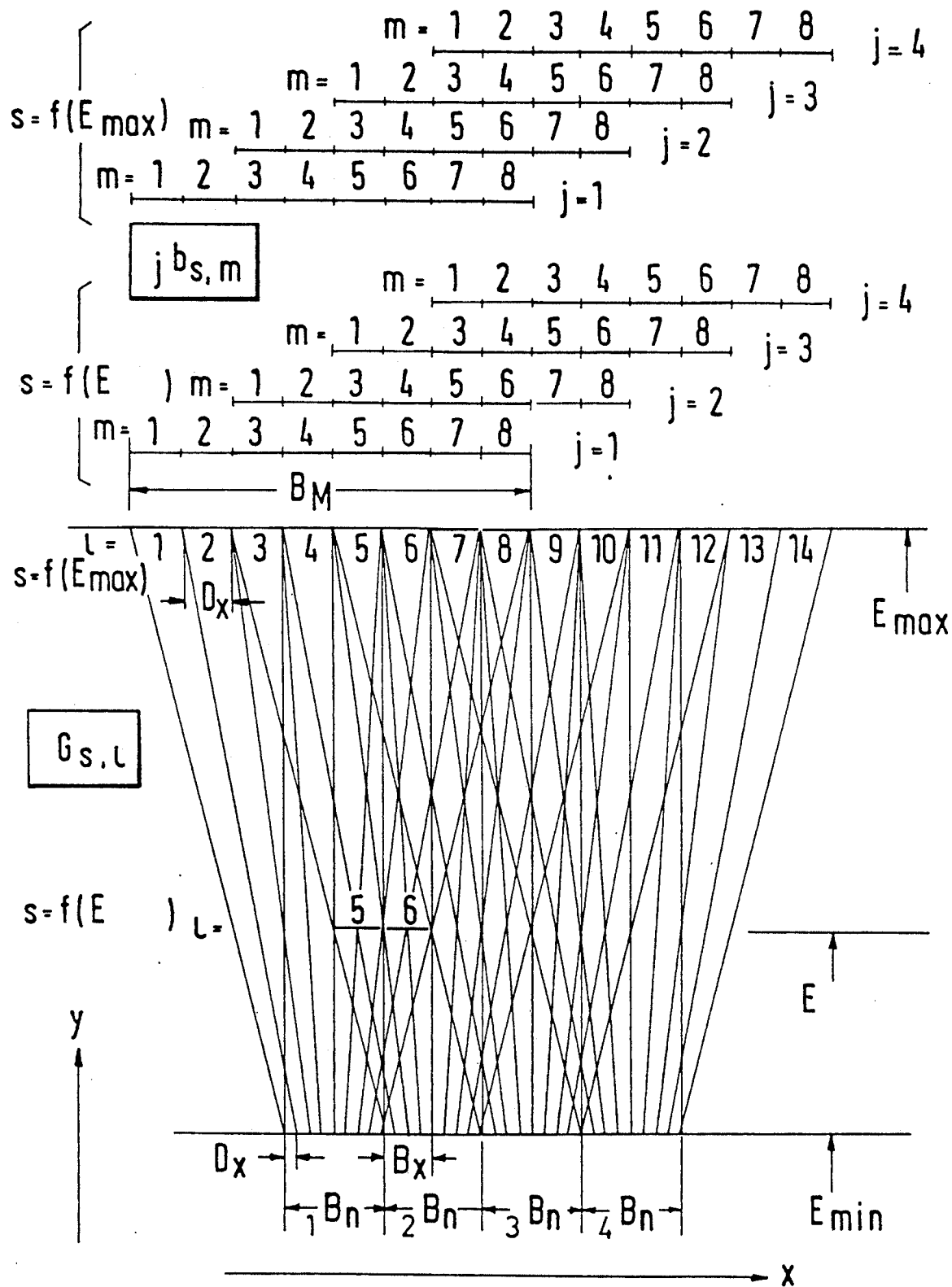
FIG. 8 is a diagrammatic illustration of a scanning region in order to explain a scanning method with an improved signal/noise ratio.
Figure 9:
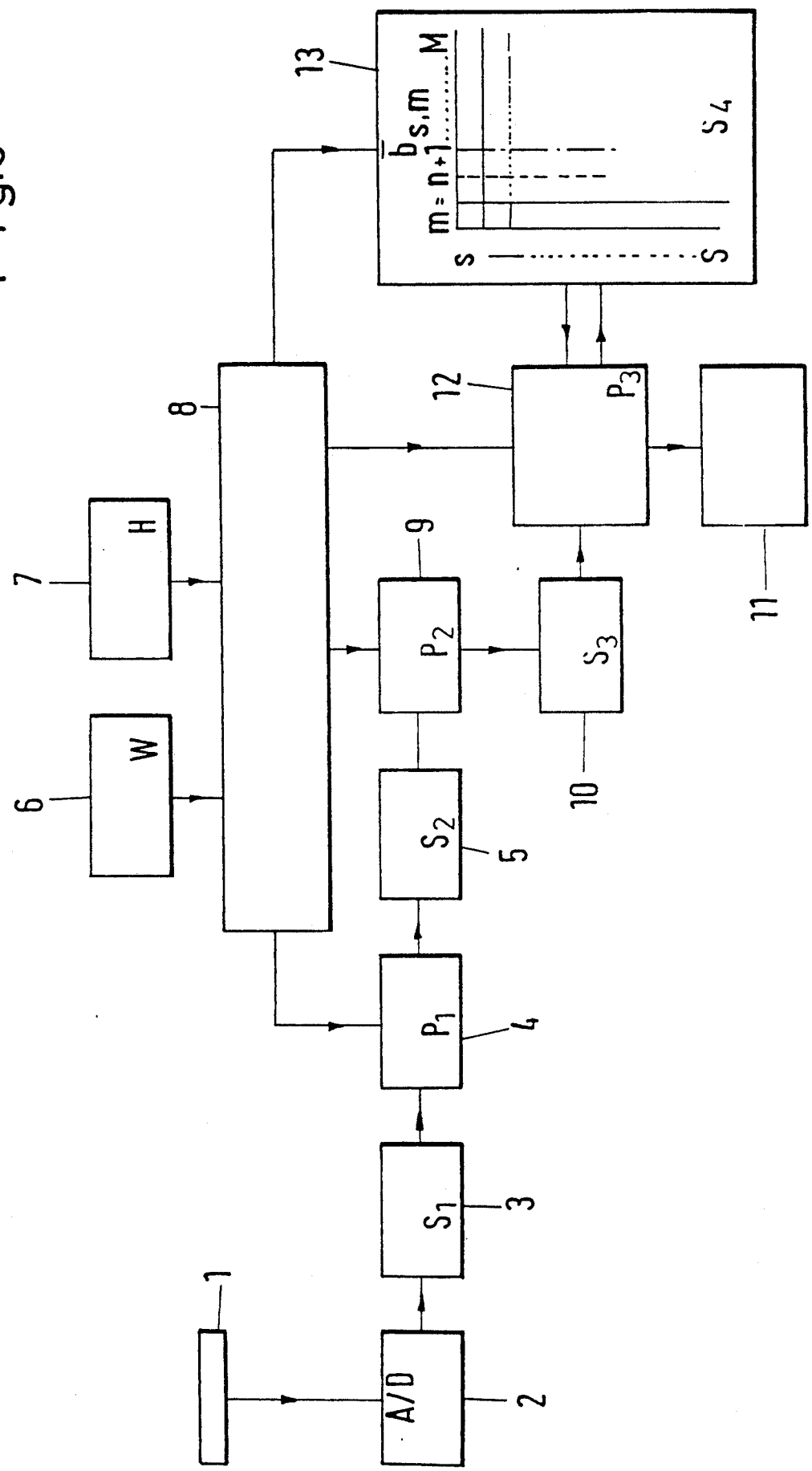
FIG. 9 is a block circuit diagram of a second embodiment of an apparatus according to the invention for scanning a terrain surface with an improved signal/-noise ratio.
Figure 10:
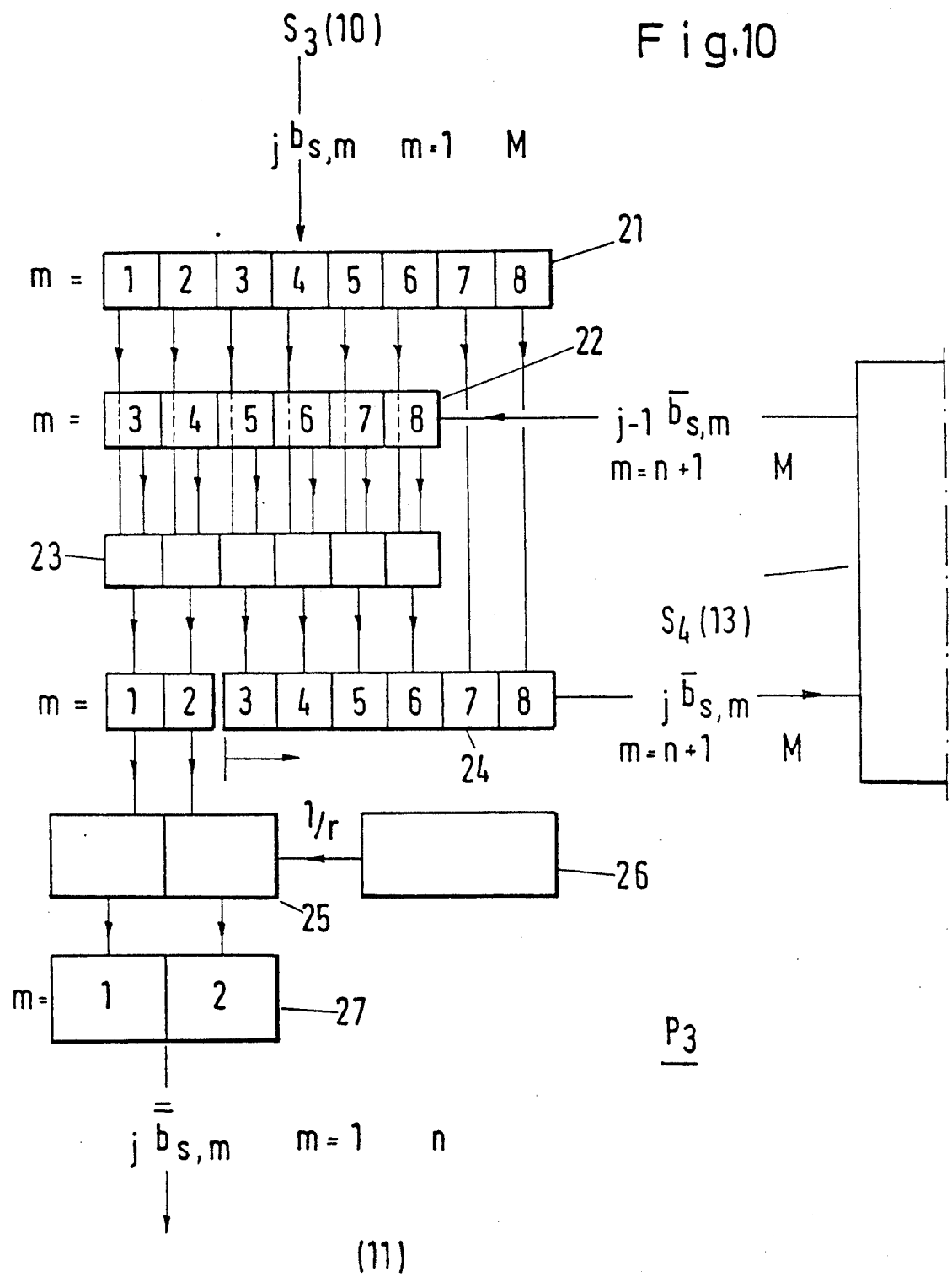
FIG. 10 is a block circuit diagram of an integration processor utilized in the apparatus of FIG. 9.
Figure 11:
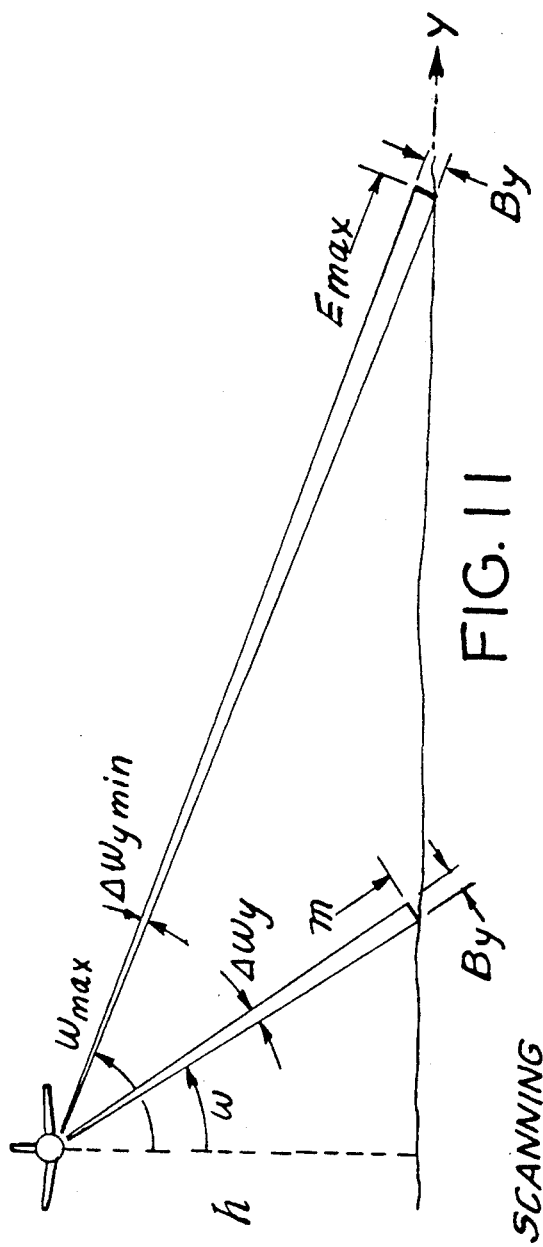
FIG. 11 is a cross-section through the scanning plane similar to FIG. 1.

An expanded scanning method is explained with the help of FIGS. 8 to 10, with the use of which the signal/-noise ratio can be improved especially for great scanning distances E.

A scanned strip with the width $B_n = n \cdot B_x$ consists respectively of n (in the example n = 2) lines with the standard pixel width $B_x$, meaning $$B_n = 2 \cdot B_x \quad (10)$$

At the minimum distance $E_{min}$ M fundamental pixels $D_x$ (in the Example M = 8) are collated into n = 2 standard pixels $B_x$. At the maximum distance its $D_{max} = B_x$. The scanning or sweeping width of the totality of M detectors is therefore for $E_{max}$;

$$B_M = M \cdot B_x = M \cdot D_{max} \quad (11)$$

While for $E_{min}$ the swept strips follow one upon each other without gaps and overlaps the adjacent strips widening in trapezium shape overlap each other with increasing distance. Therefore now not only standard pixels $b_{s,m}$, which lie within the strip region $B_n$ are formed during a strip scanning (in FIG. 8 m = 4, 5), rather also the standard pixels $b_{s,m}$ (m = 1 ... M) up to a maximum strip width $B_M = M \cdot B_x$, this to the extent possible and as required by the signal/noise ratio beginning with a specific distance, for instance $E_{Average}$ up to a maximum distance $E_{max}$.

In the circumstances depicted in FIG. 8 there is formed at a maximum distance $E_{max}$ a fourfold overlap or sweep of each terrain pixel (for instance $G_{s,7}$ and $G_{s,8}$, wherein $s = f(E_{max})$ with f indicating a function).

In case of the distance $E_{Avg}$ the overlap of adjacent strips is less as can be discerned from FIG. 8. for this distance for instance the pixels $_jb_{s,1}, _jb_{s,2}, _jb_{s,7}, _jb_{s,8}$ cannot be formed, and only one double integration is possible. In this case only the pixels $_jb_{s,5} + _{j-1}b_{s,3}$ or $_jb_{s,6} + _{j+1}b_{s,4}$ are added. The reduction factor in this case is $1/r = \frac{1}{2}$, it is independent of the distance; the terrain pixels $G_{s,5}$ and $G_{s,6}$ ($s = f(E_{Avg})$) are scanned only twice.

One discerns from FIG. 8 that the pixels $_jb_{s,m}$ of one scan $j - 1$ overlap respectively the pixels $_jb_{s,m}$ of the next scan which pixels are shifted by the amount n.

For a realization of this method the corresponding pixels of adjacent scanned strips must appropriately be stored digitally and must be successively integrated.

FIG. 10 shows a basic embodiment example of an integration processor P3 for this integration process, which is based on the circumstances in FIG. 8. FIG. 10 only shows the functional mode.

The circuit diagram of the overall system is depicted in FIG. 9, wherein the individual components have been given the same reference number to the extent that they correspond to those in FIG. 7.

Basically the following processes occur for the pixel row of one distance stage s of one strip scanning cycle j (FIG. 10):

a) Transfer of the pixel $_jb_{s,m}$ (m = 1 to M) of one pixel row s of one scanning strip j into a pixel register 21.

b) Transfer of the pre-integrated pixels $_{j-1}\bar{b}_{s,m}$ (m = n + 1 to M) from the integration memory 13 into a storage register 22.

c) Addition of corresponding pixels of the register 21 and 22 in an adder 23 in such a manner that in each case the pixels $_jb_{s,m}$ of the input register 21 are added to the pixels $_{j-1}\bar{b}_{s,m+n}$ of the storage register 22, so that the new integrated pixels $\bar{b}_{s,m}$ (m = 1 to M) are formed in an integration register 24.

d) Readout of the pixels $_j\bar{b}_{s,1}$ to $_j\bar{b}_{s,n}$ from the integration register 24 and multiplication in a multiplier 25 by the reduction factor 1/r, wherein r represents the number of the integrations (r is independent of the distance) and acceptance of the definitive, reduced pixels $\bar{j b}_{s,m}$ (m=1 to M) into an intermediate register 27.

e) Intermediate storage of the integrated pixels $\bar{j b}_{s,m}$ (m=n+1 to M) in the integration storage 13.

The integration storage 13 is built up on the basis of a matrix with S lines for each distance steps and M−n columns; compare FIG. 9.

In the present example there occurs a fourfold integration provided all the m pixel stations are occupied. Thus there result for instance the signals $\bar{j b}_{s,1}$ and $\bar{j b}_{s,2}$ for the terrain pixels $G_{s,7}$ and $G_{s,8}$ from the following integrations.

$$G_{s,7}\overline{\overline{jb_{s,1}}} = \frac{1}{4}(_1b_{s,7} + _2b_{s,5} + _3b_{s,3} + _4b_{s,1})$$

$$G_{s,8}\overline{\overline{jb_{s,2}}} = \frac{1}{4}(_1b_{s,8} + _2b_{s,6} + _3b_{s,4} + _4b_{s,2})$$

This method can also be modified for a lower degree of integrations which can be accomplished simply by reduction of the pixel number M to be formed.

FIG. 9 shows in a basic functional illustration the functional sequence of the whole system.

For distance ranges which require an integration of adjacent scanning strips, the pixel signal $_j b_{s,m}$(m=1 to M) are formed in the manner described above through the memories 3 and 5 and the processors 4 and 9 for respectively one distance step s and are loaded through the memory 10 into the input register 21 of the integration processor 12. At the same time the already pre-integrated pixel $_{j-1}\bar{b}_{s,m}$(m=n+1 to M) are loaded from the integration memory 13 into the memory register 22. After addition, reduction and readout of the definitive integrated pixels $_j\bar{b}_{s,m}$ (m=1 to 1 to n) into the intermediate memory 27, the content of the integration register 24 is stored into the integration memory 13.

The integration memory 13 must therefore have S lines and (M−n) columns wherein each station contains one integrated signal value $\bar{b}_{s,m}$.

The scanning process transversely to the direction of flight utilizing several individual detectors arranged in a row is designated in the technical literature often as a "whisk broom" method. The method and apparatus of the invention so far described uses extensively digital signal processing. The object pixels to be generated are produced by a "compilation" of discrete signals by means of a "resampling" process. This manner of proceeding requires considerable digital-electronic expenditure and leads to discontinuous skipping and thus to certain inaccuracies. Also, the adaptation of the hitherto described embodiments to changing flight altitudes and flight speeds requires substantial numbers of digital memories and controls.

A considerable improvement and simplification is achieved by means of the improved embodiments described hereinafter in connection with FIGS. 11–17. In the improved embodiments, the generation of the object pixel signals occurs by a digital control of the scanning period $\Delta t_y$ of the à priori analogous parallel detector signals and their storage in (M) memories, from which an analog time signal S(t) is formed by means of serial readout, which is scanned in (n) constant periods $\Delta t_x$ wherefrom the definitive signals corresponding to the object pixels (B) are formed, wherein the scanning periods $\Delta t_y$ and $\Delta t_x$ are respectively functions of the scanning distance (E) or the flight altitude (h) and the scanning angle ($\omega$). Three improved embodiment examples are explained with the help of FIGS. 13, 14 and 15. In the improved embodiments, the incremented scanning angle $\Delta\omega$ of the detectors continuously changes in the course of one object sweep. The short detector scanning period $\Delta t_y$ thus diminishes in the direction of larger object scanning angles. As a result, the object pixels formed along one object sweep have essentially the same size, so that the detector signals correspond directly to the standard object pixels desired.

The following designations are used in the description and the drawings that follow, which is similar to that used in the earlier embodiments:

| | |
|---|---|
| $B = B_x = B_y$ | Size of object pixels |
| n | Quantity of parallel pixel rows of one scan |
| $B_n = n \cdot B$ | Width of one scanning strip |
| E | Scanner to object pixel scanning distance |
| $E_{max}$ | Maximum scanning distance |
| $h = E_{min}$ | Flight altitude |
| $k = \dfrac{E_{max}}{h}$ | Contant |
| v | Flight or air speed |
| w | Scanning angle, direction of the scanning beam from the scanner to the object pixel, referred to a plumb line |
| $\dot\omega$ | Angular velocity of the object scanning beam |
| $\Delta t_y$ | Scanning period of the detector signal |
| $\Delta t_x$ | Scanning period of the line signal |
| $\Delta t_M$ | Read out cycle of the line memories |
| | Number of line memory chains |

Figure 12:
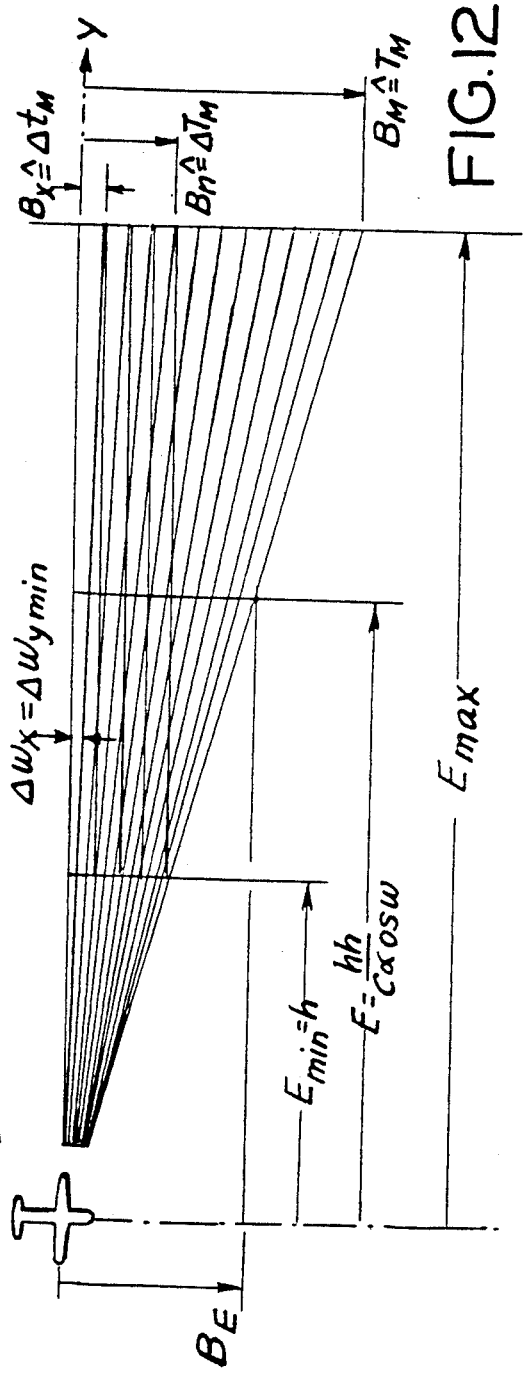
FIG. 12 shows a scanning plane $E_{max}$, into which other scanning distances are rotated, and in which the respective scanning periods have also been inserted, to explain several improved embodiments.
Figure 13:
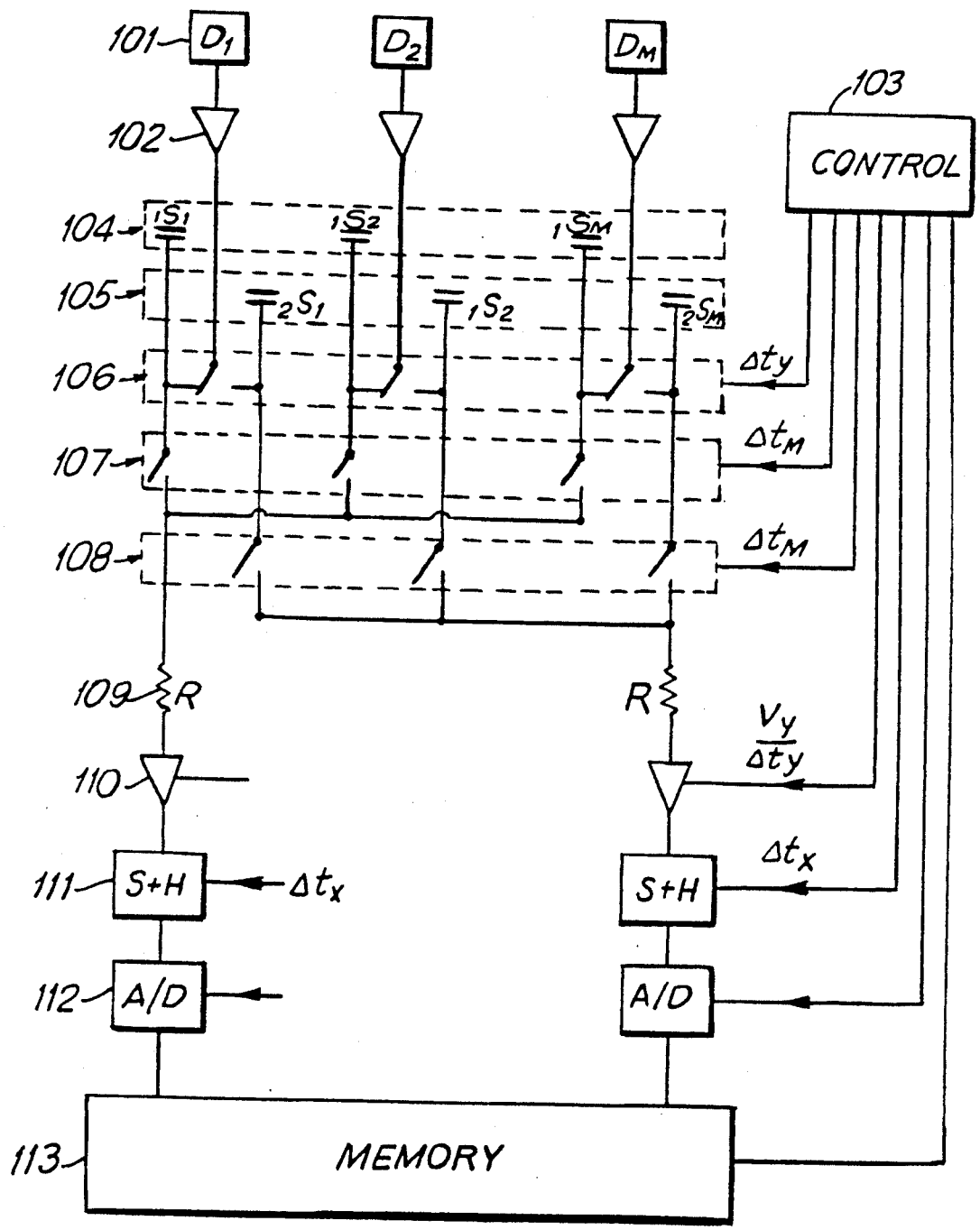
FIG. 13 is a block circuit diagram of a first improved embodiment showing the basic structure of the signal processing with analog memories.
Figure 14:
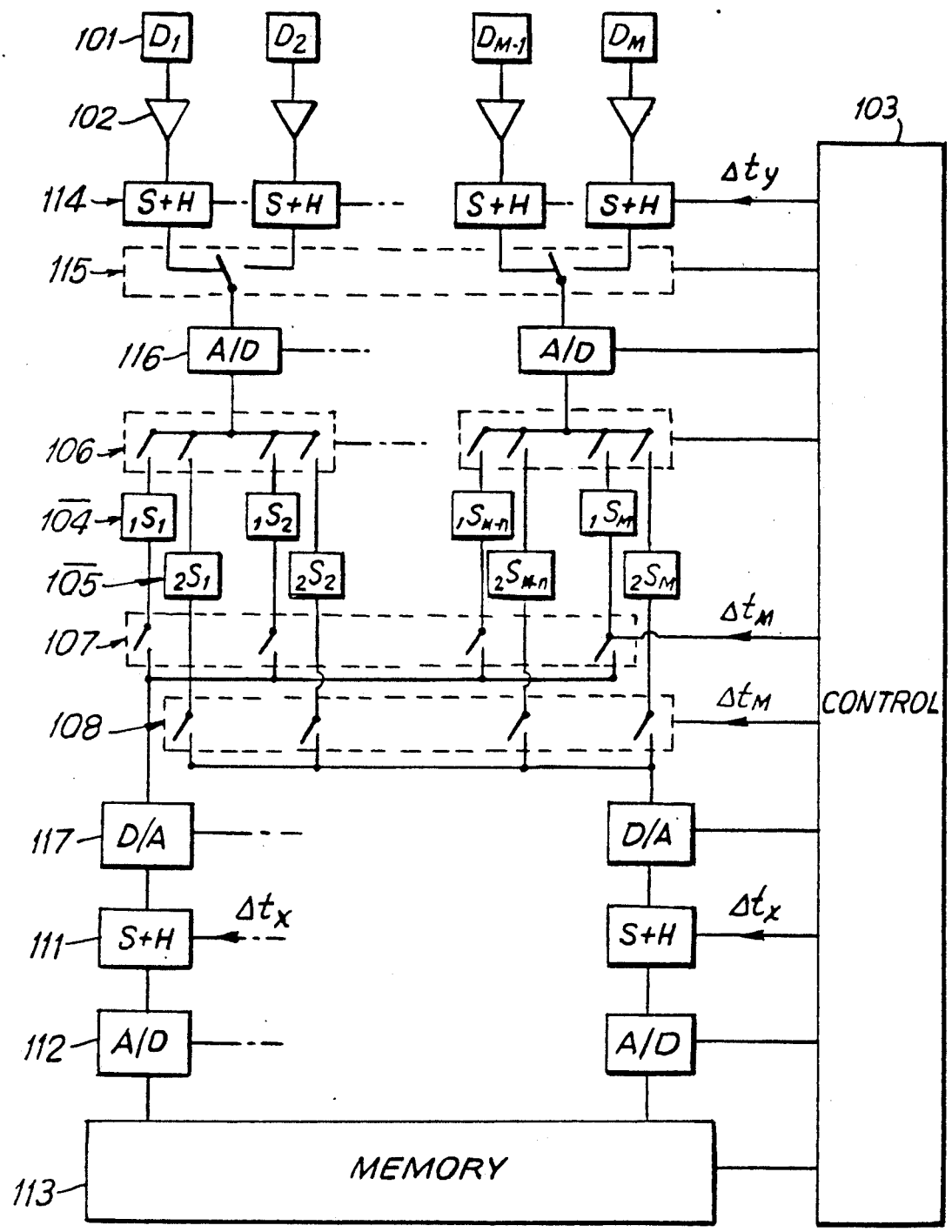
FIG. 14 is a view similar to FIG. 13 of a second improved embodiment showing the basic structure of the signal processing with digital memories.
Figure 15:
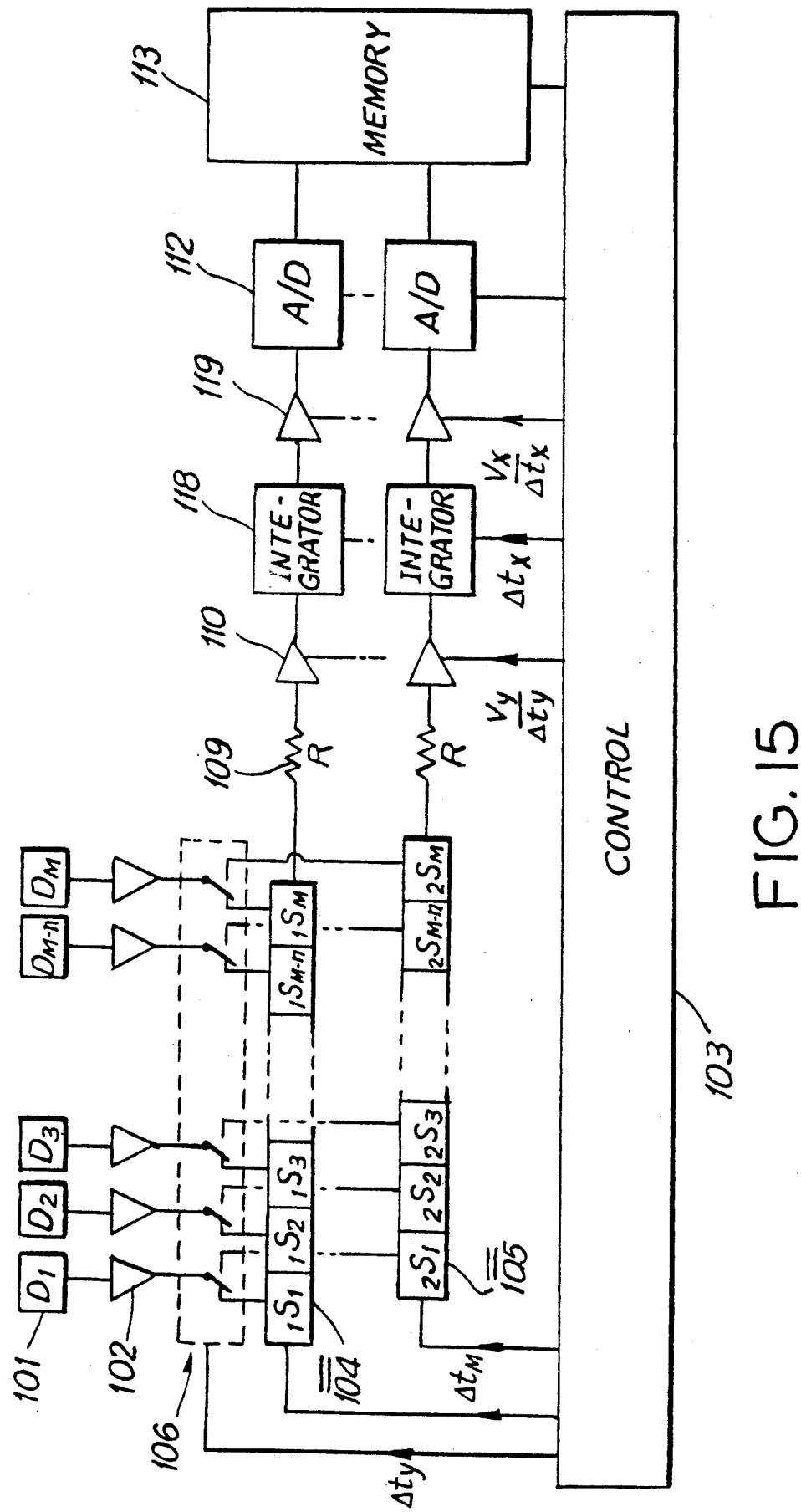
FIG. 15 is a view similar to FIG. 13 of a third improved embodiment showing the basic structure of the signal processing with CCD-memories and their read out in the form of "Charge Coupled Devices" (CCD's)
Figure 16:
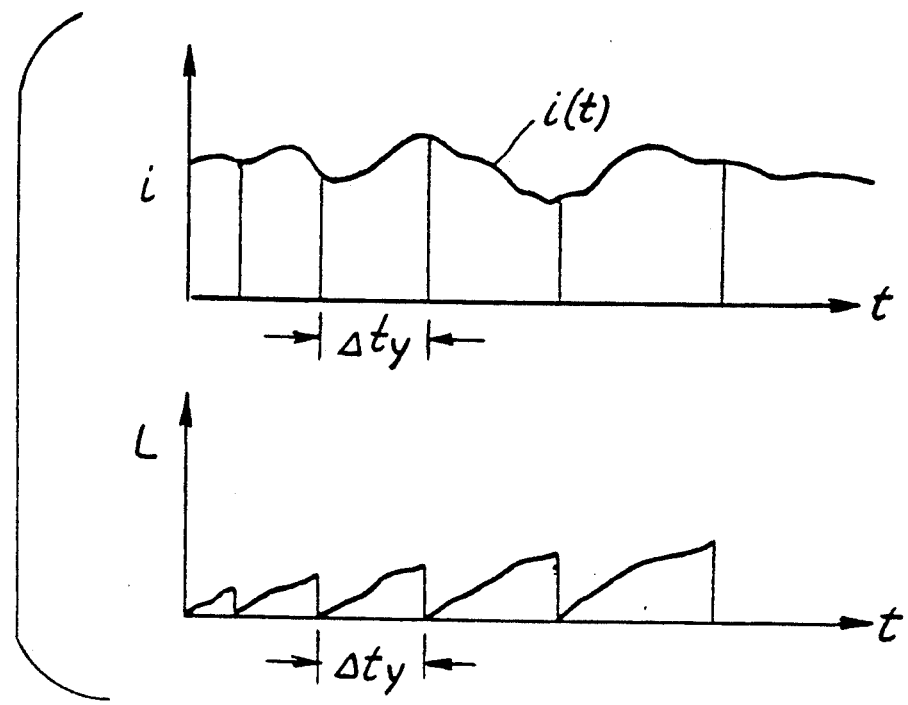
FIG. 16 shows several waveforms illustrating the principle of the detector signal formation by integration.

As described above, one proceeds from the fact that the scanning process is performed with a row of detectors whose projection upon the terrain being flown over lies transversely to the direction of scanning and therefore in direction of flight X (FIGS. 11 and 12), the detector row consisting of a quantity M of discrete individual detectors 101, $D_1$ to $D_M$ (FIGS. 13, 14, 15). The signals are processed in a parallel and identical manner. The true useful signals are generated in appropriate preamplifiers 102 by separation from an always existing dark signal, they are classified as far as their sensitivity differences are concerned and are available as a useful signal current i(t), wherein the current strength i is proportional to the radiation intensity of the object (FIG. 16). This continuously flowing signal current i(t) (which is modulated by the object radiation and is overlapped by a certain signal noise) is scanned at time intervals $\Delta t_y$ and is fed respectively to a memory S, for instance a compacitor (FIG. 13). There the signal charges $$L = i(t) \cdot \Delta t_y \tag{12}$$

are formed; $\Delta t_y$ is controlled as a function of the scanning angle $\omega$ and corresponds respectively to an angular increment $\Delta\omega_y$ (see FIG. 11).

$$\Delta t_y = \frac{\Delta\omega_y}{\omega} = \frac{B_y}{E \cdot \omega} = \frac{B_y \cdot \cos\omega}{h \cdot \omega} \tag{13}$$

$$\Delta t_y = k_y \cdot \cos\omega$$

It will be noted that the signal charges of consecutive scanning periods are not directly comparable because of the differing integration—or scanning periods $\Delta t_y$; rather they have to be accordingly classified.

In order to have sufficient time for the ensuing processing of the M detector signals of one scanning period $\Delta t_y$, the signals of consecutive scanning periods accumulating in a parallel manner are stored by distributors 106 (Multiplexers) in several memory chains 104, 105. At least l=2 identical parallel buffer memory chains with respectively additional signal processing chains are arranged depending upon the time requirements.

Only two memory chains 104, 105, or $\overline{104}$, $\overline{105}$, or 104, 105, are drawn in FIGS. 13, 14, 15.

The memories are designated as follows:

| $_1S_1$ | $_1S_2$ | $_1S_M$ |
| $_2S_1$ | $_2S_2$ | $_2S_M$ |
| $_lS_1$ | $_lS_2$ | $_lS_M$ |

After the last memory row $_lS_1 \ldots _lS_M$ is filled, the signals of the first memory row have been processed further, and the signals of the next scanning period can again be stored in the first memory row $_1S_1, _1S_2 \ldots _1S_M$ etc.

Instead of integrating the detector signals as current i(t) respectively into one charge L they can also be generated as voltage signals u(t) and can be scanned within the digitally controllable scanning periods $\Delta t_y$ by sampling—and holding circuits 114, as is depicted in the embodiment example in FIG. 14.

A classification according to the scanning periods $\Delta t_y$ is unnecessary in this case.

In the embodiment example in FIG. 14 the detector signals are stored digitally. Their digitizing occurs by means of analog-digital converter 116 after scanning by sampling—and holding switches 114. It can be appropriate to digitize several detector signals consecutively by means of an A/D-converter, wherein the time sequence is controlled by the multiplexer 115.

Figure 17:
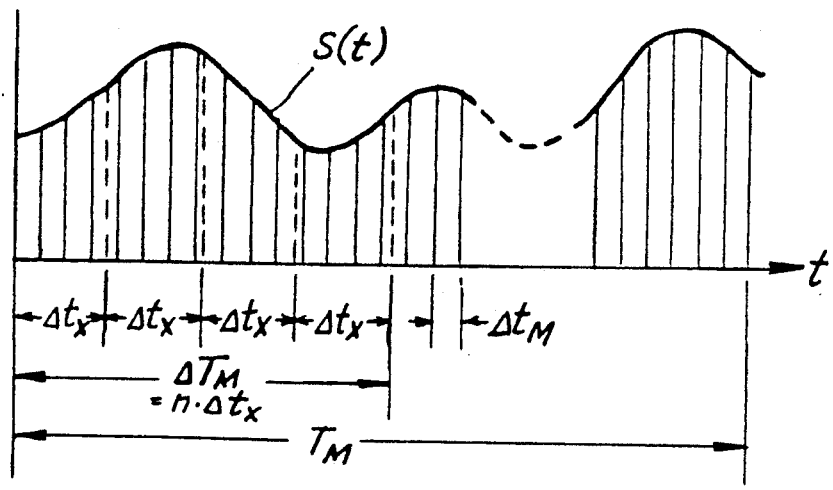
FIG. 17 shows a waveform illustrating the principle of the line signal formation and scanning process.

An analog signal is formed from the signals of one scanning period $\Delta t_y$ or one memory row $_lS_1 \ldots _lS_M$ appearing in the analog or digital M memories, which analog signal represents the radiation progression of one line. This analog line signal s(t) is treated similarly as the individual detector signals. A line signal is respectively scanned at equal scanning periods $\Delta t_x$, wherein $\Delta t_x$ represents a function of the scanning angle $\omega$ and $k_x$ represents a constant (FIG. 17).

$$\Delta t_x = k_x \cdot \cos \omega \qquad (14)$$

n $\Delta t_x$-periods are always samples (FIG. 17) of each line by means of sampling—and hold switches 111 in accordance with FIG. 13 or 14 or by means of integrators 118 in accordance with FIG. 15 which integrate the line signals s(t) within the periods $\Delta t_x$. They form the definitive signals of the object pixels B, which are properly digitized by analog-digital converters 112 and stored in a memory module 113 (FIGS. 13, 14, 15).

The formation of the analog line signals s(t) can occur in various ways, depending on whether the detector signals of one line are stored in an analog (for instance in capacitors) or in a digital manner.

In order to handle time critical problems several, at least l=2 memories and signals processing chains are arranged as has already been indicated, which receive the signals of consecutive lines and process these in a parallel fashion (FIGS. 13, 14, 15). If the detector signals of one line are stored in an analog, for instance in condensers 104 and 105 manner (FIG. 13), then these are read out one after the other by means of analog multiplex switches 107, 108 and thus form a continuous analog line signal s(t) (FIG. 17), wherein the resistances R 109 together with the capacitors 104 or 105 cause a certain smoothing out of the line signal.

If the detector signals are stored in a digital manner (FIG. 14) then they are also read out consecutively by means of multiplexer 107, 108 and are converted through digital-analog-converters 117 into an analog signal s(t) (FIG. 17).

The integration of the detector signals, their storage and the formation of the line signals can also occur in known, so-called "Charge Coupled Devices" (CCD's) 104, 105 in accordance with FIG. 15. These analog memory chains are serially read out with the cycle or timing signal $\Delta t_M$.

In order to form a complete line signal s(t), M stored signals must always be read out from the l memory chains 104 and 105 or $\overline{104}$, $\overline{105}$ or $\overline{104}$, $\overline{105}$. The read-out cycle or timing $\Delta t_M$ is constant, the total time of the line signal s(t) is thus $$T_M = M \cdot \Delta t_M = \text{constant} \qquad (15)$$

Respectively one time segment $\Delta T_M$ is required out of this complete line signal $T_M$, which segment is required for formation of n pixel signals B (FIG. 17).

This time segment $\Delta t_M$ cannot be greater than the time available for the further processing of one line signal. This results from the scanning interval $\Delta t_y$ and the quantity of the buffer memory rows 104, and 105 or 104 and 105 or $\overline{104}$ and $\overline{105}$ or $\overline{104}$ and $\overline{105}$.

$$\Delta T_M \leq \Delta t_y \cdot (l-1) \qquad (16)$$

Now the cycle time $\Delta t_M$ must be determined, at which the memory chains are to be read out. The shortest detector period $\Delta t_{y\ min} = \Delta t_o$ arises at the greatest distance $E_{max}$ $$\Delta t_o = \frac{B_y}{E_{max} \cdot \omega} \qquad (17)$$

In this case n memories or pixels are to be read out, meaning that for $$\Delta t_M = \frac{\Delta T_M}{n} \leq \frac{\Delta t_o}{n} (l-1) \qquad (18)$$

must be chosen therefor $$\Delta t_M = \frac{B_y(l-1)}{E_{max} \cdot n \cdot \omega} \qquad (19)$$

The following relationships can furthermore be discerned from FIG. 12

$$\frac{\Delta T_M}{T_M} = \frac{B_n}{B_E} \qquad (20)$$

$$\frac{B_E}{B_M} = \frac{E}{E_{max}} \qquad (21)$$

$$B_n = n \cdot B_x \qquad (22)$$

$$B_M = M \cdot B_x \qquad (23)$$

One obtains from equations (20) to (23) for $\Delta t_M$:

$$\Delta T_M = \frac{T_M \cdot n \cdot E_{max}}{E \cdot M} \quad (24)$$

and for $\Delta t_x$ one obtains:

$$\Delta t_x = \frac{\Delta T_M}{n} = \frac{T_M \cdot E_{max}}{E \cdot M} \quad (25)$$

If one inserts equation (15) into equation (25) then with $$K = \frac{E_{max}}{h}$$

$$\Delta t_x = \Delta t_M \cdot k \cdot \cos \omega \quad (26)$$

For the examples of the signal formation by means of integration of detector signals according to FIGS. 13 and 15 the classification occurs by means of the digitally controlled amplifiers 110 with the factor $V_y/\Delta t_y$ where $V_y$ represents an amplification constant.

In the example in FIG. 14 the scanning process of the detector signals can also occur by means of integration. The scanning process of the line signal s(t) at the scanned cycle $\Delta t_x$ occurs by means of sampling - and hold switches 111 in the examples in FIGS. 13 and 14. In this case no classification is required.

In the example in FIG. 15 the line scanning occurs by means of integration according to FIGS. 16 and 17. In this case a classification with the factor $V_x/\Delta t_x$ by a digitally controlled amplifier 119 is required after integration of the $\Delta t_x$ signals, wherein $V_x$ represents an amplifier constant.

In the example in FIG. 15, the classification could be performed with respectively one single amplifier 119 per signal chain, wherein the classification factor would have to be controlled in accordance with $$\frac{V_{x,y}}{\Delta t_x \cdot \Delta t_y}$$

In this case the amplifiers 110 are eliminated.

For signal generation by integration a classification is in any case necessary. It can be eliminated in case of sampling—and hold scanning.

The entire control of the chronological sequence occurs by means of a central control 103, which receives the measured data $\omega$, h, v from appropriate sensors.

The digitalized object pixel data are received by a memory 113 and are possibly processed further. The embodiment examples described above can naturally be combined and varied.

Scanning by means of integration of the detector—and line signals basically yields better average values than by means of the sampling and holding scanning. It has to be decided that in each case in actual practice which embodiment form is the most appropriate.

This signal evaluation in accordance with the improved embodiments of the invention affords the following advantages:

1. The analog detector, and line signal formation and the digitally controlled scanning process combines the advantage of the rapid signal processing with low cost and good adaptability to flight altitude and air speed.

2. The solution proposed can be easily realized as an integrated circuit and therefore enables the processing of a relatively high number of detector signals.

3. By arranging several l parallel processing chains this solution can meet even extreme requirements concerning processing speed.

Those skilled in this art will have no difficulty in implementing the method and apparatus which is described in detail above, as the various components included in the described systems are conventional. In addition while preferred examples have been described, those skilled artisans will recognize that variations and modifications thereof within the spirit of the invention will be evident and are intended to be included within the scope of the appended claims.

What is claimed is:

1. A method for producing an image of the surface of an object, comprising the steps:
    a) flying over the object while periodically scanning the object in a plurality of scanning sweeps in a scanning direction transversely to the flying direction with a scanner comprising a row of individual equal-sized detectors oriented transversely to the direction of scanning,
    b) during each scanning sweep the output signal of each individual detector is scanned in a plurality of short scanning periods $\Delta t$ each corresponding to a small incremental angle of the object for generating a sequence of fundamental detector signals, whereby the fundamental detector signals become associated with respective fundamental object pixels each of whose width is perpendicular to the said scanning direction and each of whose size is a function of the distance range of the object pixel from the scanner,
    c) storing the fundamental detector signals of all individual detectors of the row for each scanning sweep,
    d) combining the stored fundamental detector signals to form therefrom an image of the object composed of a grid of standard object pixels (B) having the same size independently of their distance range from the scanner and such that during each scanning sweep a strip (j) corresponding to the surface of the object is formed, each said strip, in its width and length, being respectively composed of a constant quantity of standard object pixels.

2. A method as claimed in claim 1 wherein the object is a terrain surface, and the combining step is carried out over several consecutive scanning periods.

3. A method according to claim 1, characterized int hat one or several rows of parallel object pixels of equal size are formed in said strip by combining the detector signals of one scanning period.

4. A method according to claim 1, characterized in that a uniform pixel grid of equally large standard object pixels (B) is formed for each scanned strip (j) in the overlap regions of adjacent scanned strips, and that the pixel signals (b) corresponding to the standard pixels (B) of adjacent strips covering equal terrain pixels (G) are integrated in order to improve the signal/noise ratio.

5. A method according to claim 4, wherein said integration step is characterized in that
    a) the standard pixel signals ($b_{s,m}$; $m = 1$ to $M$) of one distance range formed within one scanned strip (j), which distance range can contain at a maximum up to M pixels, are loaded from an intermediate register (10) into the input register (21) of an integration processor (12), b) the pre-integrated pixels ($_{j-1}b_{s,m}$; m=n+1 to M) of the previous scanning operation (j−1) are loaded from one integration memory (23) into a memory register (22) of the integration processor (12), c) the pixels ($_{j-1}b_{s,m}$) of the input register (21) are added with the pixels ($_{j-1}b_{s,m}$; m=n+1 to M) of the storage register (22) which have been offset by n pixels, the addition being performed by an adder (23), so that the new integrated pixels ($_jb_{s,m}$; m=1 to M) are generated in an integration register (24) of the integration processor (12).

d) the pixels ($_jb_{s,m}$; m=1 to n) are read out from the integration register (24) and the definitive pixels ($_jb_{s,m}$; m=1 to n) are produced by multiplication in a multiplier (25) by the reduction factor 1/r and are stored in an intermediate register (27), wherein r represents the number of the integrations, which are supplied by a control computer (26) to the multiplier, e) the pixels ($_jb_{s,m}$; m=n+1 to M) are accepted from the integration register (24) into the integration storage (13), and that these processes a) to e) are repeated for each distance range (s) and for each scanning strip (j).

6. Apparatus for scanning in a plurality of scanning sweeps a terrain surface or other objects transversely to the direction of flight or direction of motion (X) of a scanner with a scanning element and a detector row arranged at right angles to the scanning direction (Y), said scanner comprising a plurality (M) of individual detectors (D) of equal size, means connected to the scanner for forming detector signals and therefrom, by scanning the output signal of each individual detector within each scanning sweep over a plurality of short scanning periods $\Delta t_y$, object pixels of equal size ($B_x = B_y = B$) independently of the scanning distance (E) or the scanning angle ($\omega$), said object pixels (B) extending always perpendicularly to the scanning direction and said object pixels always forming a uniform grid with constant object pixel quantity (n) within the constant width ($B_n$) of the scanned object strip over the entire region of one sweep, said means for forming said detector signals comprising means for digital control of the scanning period $\Delta t/y$ in accordance with the following formula:

$$\Delta t_y = \frac{B_y}{E \cdot \omega} = \frac{B_y}{h \cdot \omega} \cos \omega;$$

where E is the scanning distance, h is the flight altitude, $\omega$ is the scanning angle, and $\omega$ the angular velocity of the scanning element.

7. Apparatus according to claim 6, further comprising (M) memory cells for storing (M) detector signals of one scanning period ($\Delta t_y$), means for consecutively reading the memory cells and for forming therefrom an analog line signal s(t) of a scanning period, and means for scanning said line signal s(t) within (n) digitally controlled scanning periods ($\Delta t_x$) of equal lengths such that this scanning period ($\Delta t_x$) corresponds to the object pixel size $B_x = B_y = B$ and the scanning period ($\Delta t_x$) of one line signal s(t) is a function according to the formula:

$$\Delta t_x = k_x \frac{h}{E} = k_x \cos \omega;$$

wherein $k_x$ represents a constant which determines the read-out speed of the line signal s(t), E is the scanning distance, h is the flight altitude, and $\omega$ is the scanning angle.

8. Apparatus according to claim 7, characterized in that said (M) memory cells comprise capacitors, and analog switches are provided for reading consecutively said memory cells to form the line signal s(t).

9. Apparatus according to claim 7, characterized in that said (M) memory cells comprise charge coupled devices for serially supplying the detector signals to form the line signal s(t).

10. Apparatus according to claim 7, characterized in that means are provided for digitizing the detector signals and for digitally storing them in the memory cells, and a digital analog converter is provided for converting the digitized detector signals into the analog line signal.

11. Apparatus according to claim 7, characterized in that the means for scanning said line signal s(t) comprises integration means or sample-and-hold switches.

12. Apparatus according to claim 7, characterized in that the memory cells comprise several (1) memory chains, whereby the processing of the detector signals occurs in (1) paralled signal chains.

13. Apparatus according to claim 6, characterized in that the detector signals are formed by integration over the scanning period $\Delta t_y$ or by means of sample and hold scanning with the scanning period $\Delta t_y$.

14. Reconnaissance apparatus comprising means for scanning an object while flying over it, an array of individual, equal-sized detectors (1) arranged in a row transverse to the flying direction for generating signals during the scanning over consecutive exposure periods forming a non-uniform pixel grid image representative of the scanned object, and means for transforming the non-uniform pixel grid image into a regular pixel grid image to achieve a more uniform resolution; said transforming means comprising a) a first memory (3) for storing the signal of individual detectors (1) within one exposure period.

b) a first processor (4) for combining signals of the individual detectors (1) into groups, c) a second memory (5) for storing the signals of consecutive exposure periods corresponding to each of the groups, d) a second processor (9) for combining individual groups of consecutive exposure periods for generation of object pixels, and e) a bulk storage (11) for storing the object pixels.

15. Apparatus according to claim 14, characterized in that a programming module (8) for control of the first and second processors (4, 9) is provided, which is connected with an angular position transmitter (6) of the scanner and an altimeter (7), said programming module forming distance dependent detector signal combinations and controlling the first and second processors (4, 9) on the basis of these signal combinations.

16. Apparatus according to claim 15, characterized in that the angle position transmitter (6) always supplies the scanning angle relative to a vertical line extending straight down from the scanner to the object.

17. Apparatus according to one of the claims 14 to 16. characterized int hat an integration register (13) is provided, in which the integrated pixel values ($jb_{s,m}$) are stored in matrix fashion, wherein the integration register (13) comprises (M−n) columns and S lines, where S=the quantity of distance steps, M=the number of detectors, and n=the number of consecutive exposure periods.

18. Apparatus according to claim 17, characterized in that a multiplier is provide connected to the integration register (13) for the multiplication of the integrated pixel values, said multiplier (25) having a predetermined multiplication factor controlled by a control computer (26) independently of the object distance.

* * * * *